(12) United States Patent
Williamson et al.

(10) Patent No.: US 9,776,562 B2
(45) Date of Patent: Oct. 3, 2017

(54) ROLL-UP TONNEAU COVER HAVING A TENSIONING MECHANISM AND A SIDEWAYS LATCH

(71) Applicant: Rugged Liner, Inc., Owosso, MI (US)

(72) Inventors: Scott Williamson, Orlando, FL (US); David Kosinski, Northville, MI (US); Michael Yang, St. Charles, IL (US); Xichang Yan, Jiangsu (CN); Jianfeng Tong, Jiangsu (CN); Chengping Wei, Jiangsu (CN)

(73) Assignee: Rugged Liners, Inc., Owosso, MI (US)

( * ) Notice: Subject to any disclaimer, the term of this patent is extended or adjusted under 35 U.S.C. 154(b) by 0 days.

(21) Appl. No.: 15/135,960

(22) Filed: Apr. 22, 2016

(65) Prior Publication Data
US 2016/0236555 A1      Aug. 18, 2016

Related U.S. Application Data

(63) Continuation-in-part of application No. 14/854,880, filed on Sep. 15, 2015, now abandoned.
(Continued)

(30) Foreign Application Priority Data

Apr. 23, 2015   (CN) .......................... 2015 1 0195963

(51) Int. Cl.
*B60J 7/02*       (2006.01)
*B60Q 3/06*       (2006.01)
(Continued)

(52) U.S. Cl.
CPC ................ *B60Q 3/06* (2013.01); *B60J 7/068* (2013.01); *B60Q 3/30* (2017.02)

(58) Field of Classification Search
CPC .................................... B60J 7/104; B60J 7/02
(Continued)

(56) References Cited

U.S. PATENT DOCUMENTS 4,607,876 A    8/1986 Reed
4,730,866 A    3/1988 Nett
(Continued)

FOREIGN PATENT DOCUMENTS

CA     2746916 A1     1/2012
CN     104827873 A    8/2015
(Continued)

OTHER PUBLICATIONS

Machine-Assisted English translation for CN 105416157A extracted from the espacenet.com database on Sep. 16, 2016. 20 pages.
(Continued)

*Primary Examiner* — Dennis H Pedder
(74) *Attorney, Agent, or Firm* — Harness, Dickey & Pierce, P.L.C.

(57) ABSTRACT

A roll-up cover assembly includes a cover assembly comprising first and second side rails and front and rear bumpers, as well as a cover, wherein a lower portion of an inner side of the first side rail is provided with a slideway, an adjustment base, an adjustment screw, an adjustment knob, a receiver; the adjustment base is fixed inside the first side rail and can not be moved; the adjustment base is provided with the adjustment knob thereon, the adjustment screw passes through the adjustment base and the adjustment knob, and an end part of the adjustment screw is snap-fixed into a groove on the receiver; the receiver is a separated-type structure, wherein both of the upper and lower portions are fixed onto the slideway, and when the adjustment knob is turned, the
(Continued)

adjustment screw produces a displacement and drives the receiver to slide within the slideway.

16 Claims, 4 Drawing Sheets

Related U.S. Application Data

(60) Provisional application No. 62/050,355, filed on Sep. 15, 2014.

(51) Int. Cl.
*B60J 7/06* (2006.01)
*B60Q 3/30* (2017.01)

(58) Field of Classification Search
USPC .................................... 296/100.15–100.18
See application file for complete search history.

(56) References Cited

U.S. PATENT DOCUMENTS

| | | | |
|---|---|---|---|
| 4,991,640 A | 2/1991 | Verkindt et al. | |
| 5,076,338 A | 12/1991 | Schmeichel et al. | |
| 5,096,250 A | 3/1992 | Menz | |
| 5,165,750 A | 11/1992 | Pirhonen | |
| 5,174,353 A | 12/1992 | Schmeichel et al. | |
| 5,207,262 A | 5/1993 | Rushford | |
| 5,228,736 A | 7/1993 | Dutton | |
| 5,251,951 A | 10/1993 | Wheatley | |
| 5,275,458 A | 1/1994 | Barben et al. | |
| 5,301,995 A | 4/1994 | Isler | |
| 5,365,994 A | 11/1994 | Wheatley | |
| 5,460,423 A | 10/1995 | Kersting et al. | |
| 5,472,256 A | 12/1995 | Tucker | |
| 5,584,521 A * | 12/1996 | Hathaway ............... | B60J 7/104 224/405 |
| 5,655,807 A | 8/1997 | Rosario | |
| 5,772,273 A | 6/1998 | Wheatley | |
| 5,860,691 A | 1/1999 | Thomsen et al. | |
| 5,906,407 A | 5/1999 | Schmeichel | |
| 6,024,401 A | 2/2000 | Wheatley | |
| 6,053,556 A | 4/2000 | Webb | |
| 6,053,558 A | 4/2000 | Weldy et al. | |
| 6,257,647 B1 | 7/2001 | Ninness et al. | |
| 6,293,608 B1 | 9/2001 | Dicke et al. | |
| 6,386,616 B1 | 5/2002 | Wheatley | |
| 6,543,835 B2 | 4/2003 | Schmeichel et al. | |
| 6,568,740 B1 | 5/2003 | Dimmer | |
| 6,575,520 B1 | 6/2003 | Spencer | |
| 6,585,309 B2 | 7/2003 | Dicke | |
| 6,607,234 B1 | 8/2003 | Schmeichel | |
| 6,619,719 B1 | 9/2003 | Wheatley | |
| 6,669,264 B1 | 12/2003 | Tucker | |
| 6,672,644 B2 | 1/2004 | Schmeichel | |
| 6,719,353 B1 | 4/2004 | Isler et al. | |
| 6,752,449 B1 | 6/2004 | Wheatley | |
| 6,808,220 B2 | 10/2004 | Wheatley | |
| 6,808,221 B2 | 10/2004 | Wheatley | |
| 6,811,203 B2 | 11/2004 | Wheatley | |
| 6,814,388 B2 | 11/2004 | Wheatley | |
| 6,814,389 B2 | 11/2004 | Wheatley | |
| 6,824,191 B2 | 11/2004 | Wheatley | |
| 6,851,738 B1 | 2/2005 | Schmeichel et al. | |
| 6,893,073 B2 | 5/2005 | Wheatley | |
| 6,976,724 B2 | 12/2005 | Wheatley | |
| 7,008,000 B1 | 3/2006 | Schmeichel | |
| 7,011,284 B2 | 3/2006 | Melius | |
| 7,025,403 B2 | 4/2006 | Wheatley | |
| 7,048,277 B1 | 5/2006 | Schmeichel | |
| 7,066,524 B2 | 6/2006 | Schmeichel et al. | |
| 7,104,586 B2 | 9/2006 | Schmeichel et al. | |
| 7,150,490 B2 | 12/2006 | Malmberg et al. | |
| 7,165,803 B2 | 1/2007 | Malmberg et al. | |
| 7,188,888 B2 | 3/2007 | Wheatley | |
| 7,204,540 B2 | 4/2007 | Wheatley | |
| 7,384,090 B1 | 6/2008 | Weldy | |
| 7,427,095 B2 | 9/2008 | Wheatley | |
| 7,445,264 B2 | 11/2008 | Spencer et al. | |
| 7,472,941 B2 | 1/2009 | Schmeichel et al. | |
| 7,484,790 B2 | 2/2009 | Wheatley | |
| 7,604,282 B2 | 10/2009 | Spencer et al. | |
| 7,607,714 B2 | 10/2009 | Wheatley | |
| 7,621,582 B2 | 11/2009 | Schmeichel et al. | |
| RE41,078 E | 1/2010 | Schmeichel | |
| 7,815,239 B1 | 10/2010 | Schmeichel et al. | |
| 7,828,361 B1 | 11/2010 | Spencer | |
| 8,033,591 B2 | 10/2011 | Schmeichel et al. | |
| 8,083,281 B2 | 12/2011 | Schmeichel et al. | |
| 8,128,149 B1 | 3/2012 | Wolf | |
| 8,146,981 B2 | 4/2012 | Huotari et al. | |
| 8,167,353 B2 | 5/2012 | Schmeichel et al. | |
| 8,186,740 B2 | 5/2012 | Huotari et al. | |
| 8,328,267 B2 | 12/2012 | Schmeichel et al. | |
| 8,336,946 B2 | 12/2012 | Schrader et al. | |
| 8,439,423 B2 | 5/2013 | Schmeichel et al. | |
| 8,475,096 B2 | 7/2013 | Spencer et al. | |
| 8,523,266 B2 | 9/2013 | Yue | |
| 8,567,843 B2 | 10/2013 | Schmeichel et al. | |
| 8,573,678 B2 | 11/2013 | Yue | |
| 8,596,708 B2 | 12/2013 | Schmeichel | |
| 8,632,114 B2 | 1/2014 | Yue | |
| 8,714,622 B2 | 5/2014 | Spencer et al. | |
| 8,857,887 B1 | 10/2014 | Schmeichel | |
| 8,939,494 B2 | 1/2015 | Maimin et al. | |
| 9,045,069 B2 | 6/2015 | Schmeichel et al. | |
| 9,056,542 B2 | 6/2015 | Schmeichel | |
| 9,067,481 B2 | 6/2015 | Xu | |
| 9,120,413 B2 | 9/2015 | Fink | |
| 9,260,139 B2 | 2/2016 | Schmeichel | |
| 9,278,611 B2 | 3/2016 | Maimin et al. | |
| 9,393,854 B2 | 7/2016 | Schmeichel et al. | |
| 2002/0096910 A1 | 7/2002 | Schmeichel et al. | |
| 2004/0150246 A1 | 8/2004 | Wheatley | |
| 2008/0129077 A1 | 6/2008 | Weldy | |
| 2011/0169296 A1 | 7/2011 | Schrader | |
| 2015/0246602 A1 | 9/2015 | Schmeichel et al. | |
| 2016/0075220 A1 | 3/2016 | Williamson et al. | |
| 2016/0137042 A1 | 5/2016 | Maimin et al. | |

FOREIGN PATENT DOCUMENTS

| | | |
|---|---|---|
| CN | 105416157 A | 3/2016 |
| WO | 2013056124 A1 | 4/2013 |

OTHER PUBLICATIONS

Drawing and photocopy of a picture taken in Sep. 1999 of a tonneau cover product shown at the Big Iron Farm Show in Fargo, ND, by Shur-Co, Inc. of Yankton, SD.
Shur-Co., Inc., Oct. 1999, owner's manual.
Shur-Co., Inc., Dec. 2000, owner's manual (2001).
ACCESS® Roll-up Cover Owner's Manual, © 1996, AGRI-COVER, Inc., 8 pages.
TruXedo "Deuce2" tonneau cover system "Owner's Manual" (P/N 1117648 Rev B) was publically available on or before Sep. 13, 2013, and the Tonneau Cover System illustrated and described therein was publically on sale on or before Sep. 13, 2013.

* cited by examiner

US 9,776,562 B2

ROLL-UP TONNEAU COVER HAVING A TENSIONING MECHANISM AND A SIDEWAYS LATCH

RELATED APPLICATION

The application claims the benefit of Chinese Patent Application No. 201510195963.6 filed on Apr. 23, 2015, the entirety of which is incorporated by reference. This application is also a continuation-in-part of U.S. patent application Ser. No. 14/854,880 filed Sep. 15, 2015, which in turn claims priority to U.S. Provisional Application No. 62/050,355 filed on Sep. 15, 2014, the entirety of both applications are incorporated by reference.

TECHNICAL FIELD

The present invention relates to a cover assembly, particularly to a roll-up assembly.

BACKGROUND

In the prior art, a cover assembly, also known as a hood assembly, includes a rigid cover and a roll-up assembly, wherein the rigid cover is generally a foldable structure, which can be conveniently stored when the cover is not in use. Typically, the roll-up assembly includes a cover assembly and a cover. The cover, which can also be known as a tarpaulin, is fixed onto the cover assembly which is fixed onto a compartment. The cover is generally a soft material, so a technical problem needed to be solved is how to fix the soft materials with the compartment. Additionally, another problem needed to be solved is how to adjust of the tightness of the fixed cover.

SUMMARY

An object of the present invention is to provide a roll-up assembly which is convenient to use, achieve the fixation of the cover assembly with the compartment, the fixation of the cover with the cover assembly, wherein the cover can be tightened and loosened, and thus is convenient to store and carry, and the sealing structure achieves the rainproof function and reduces wear between the compartment and the cover or cover assembly.

A roll-up assembly includes a cover assembly comprising first and second side rails and front and rear bumpers, as well as a cover, wherein a lower portion of the inner side of the first side rail is provided with a slideway, an adjustment base, an adjustment screw, an adjustment knob, a receiver; the adjustment base is fixed inside the first side rail and can not be moved; the adjustment base is provided with the adjustment knob thereon, the adjustment screw passes through the adjustment base and the adjustment knob, an end part of the adjustment screw is snap-fixed into a groove on the receiver; the receiver, which may also be known as a rear bumper cartridge, is a separated-type structure, wherein both of the upper and lower portions are fixed onto the slideway, and when the adjustment knob is turned, the adjustment screw produces a displacement and drives the receiver to slide within the slideway; the second and first side rails are symmetrically provided.

As a further preferred embodiment of the present invention, the lower portion of the inner side of the first side rail is further provided with a lock hook passing through the inner side of the first side rail and being fixed with the inner side of the first side rail by a screw, a nut and an elastic mechanism for locking the first side rail and the rear bumper; correspondingly, a locking base corresponding to the lock hook is provided in the groove of the bottom portion of the rear bumper.

As a further preferred embodiment of the present invention, outer sides of the rear and front bumpers are provided as a cylindrical shape with openings, the outer sides of the rear and front bumpers are connected with the cover, and two sides that the cover is connected with the outer sides of the rear and front bumpers are wrapped with a hard cylindrical object having a diameter larger than the opening.

As a further preferred embodiment of the present invention, the upper portion of the inner side of the first side rail and the upper portion of the second side rail are provided with a circular hole, respectively, for fixing with the front bumper; the bottom portion of the front bumper is provided with a groove having a wide bottom portion and a narrow upper portion, and is provided with two screws, wherein the spacing of the upper portion of the groove is less than the diameter of the end part of the screw; the screw passes through the circular hole of the upper portion of the first side rail and the circular hole of the second side rail, respectively, and is fixed with the first and second side rails by a damped nut.

As a further preferred embodiment of the present invention, the front bumper, the rear bumper, the first side rail and the second side rail are all hollow structures, and cross-sections of the front bumper, the rear bumper, the first side rail and the second side rail are covered using plugs; the first side of the rear bumper has a protruding portion after closing the cross-section by the plug, the protruding portion of which is snapped into the clearance between the receiver and the first side rail.

As a further preferred embodiment of the present invention, inner sides of the both sides of the back of the cover are provided with three pairs of PVC materials for bonding a stand bar which is in a cylindrical shape and has a length less than the width of the cover, and two ends of the stand bar are provided with PVC material for bonding the stand bars with the cover.

As a further preferred embodiment of the present invention, the bottom portions of the front and rear bumpers are further provided with a strap.

As a further preferred embodiment of the present invention, a bottom surface of the rear bumper is provided with a groove, and a middle part of the groove is provided with a LED lamp group.

As a further preferred embodiment of the present invention, the first and second side rails and a compartment are provided with a sealing strip there between.

As a further preferred embodiment of the present invention, the sealing strip has protruding upper eaves on the upper portion.

The beneficial effects of the present invention lies in that, the movable receiver design achieves tightening and loosening of the cover; components are detachable, and have small occupied volumes in a non-using state, thus are easy to store and carry, and are easy to install when needed to be used, and the sealing structure achieves the rainproof function and reduces wear between the compartment and the cover.

DETAILED DESCRIPTION

Figure 1:
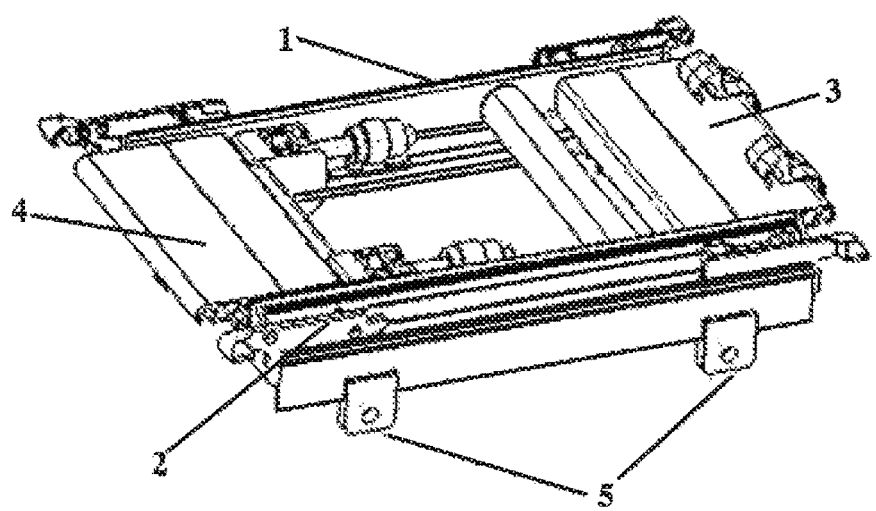
FIG. 1 is a structural schematic view of a cover assembly of the present invention.

A roll-up assembly, which may also be known as a roll-up hood, includes a cover assembly, which may also be known as a hood bracket, and a cover, which may also be known as a tarpaulin and can be rolled up. The example embodiment illustrated in the drawings herein is substantially the same as that illustrated and described in parent U.S. patent application Ser. No. 14/854,880 filed Sep. 15, 2015 and published as US2016/0075220, with one significant difference being the orientation of the lock hook and modifications related thereto as described below.

As shown in FIG. 1, the cover assembly includes a first and second side rails 1 and 2, a front and rear bumpers 3 and 4. The first and second side rails 1 and 2 may also be known as left and right side frames.

The first and second side rails 1 and 2 are fixed with a compartment through fixing mechanism 5, which is a separated-type structure, and a pair of separated-type clips fix the first side rail 1 and the compartment by a screw and a nut. The first and second side rails 1 and 2 and the front and rear bumpers 3 and 4 constitute a complete cover assembly.

Figure 2:
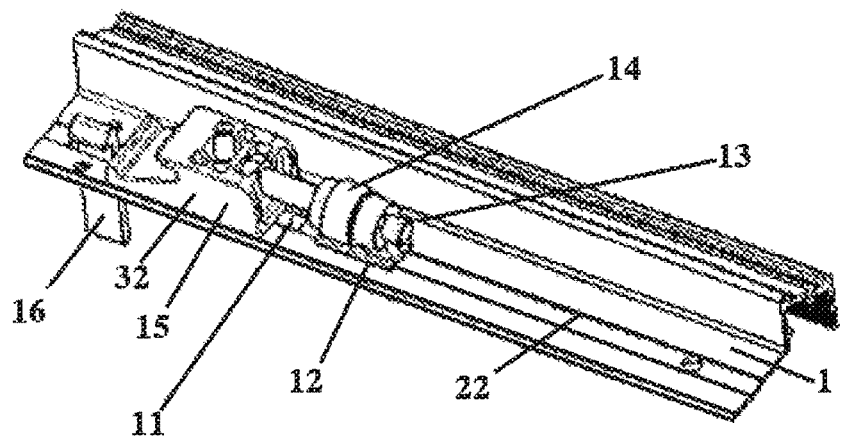
FIG. 2 is a structural schematic view of a first side rail and the components thereon.

As shown in FIG. 2, an outer side of the first side rail is a protruding shape and is provided with PVC material thereon for bonding with the cover. The upper portion of the inner side of the first side rail is provided with a circular hole, and the screw passes through the circular hole for fixing with the front bumper. The lower portion of the first side rail is provided with a slideway 11, an adjustment base 12, an adjustment screw 13, an adjustment knob 14, a receiver 15 which also may be known as a rear bumper cartridge, and a lock hook 16. The slideway is an indented portion of the first side rail which allows the receiver or other objects to slide back and forth along the length of the slideway. It is contemplated that the slideway may extend across the entire length of the first side rail or just a portion of the first side rail. The adjustment base 12 is directly fixed with the inner side of the first side rail and can not be moved. The adjustment base 12 is provided with the adjustment knob 14 thereon, the adjustment screw 13 passes through the adjustment base 12 and the adjustment knob 14, and when the adjustment knob 14 is turned, the adjustment screw 13 produces a displacement due to the effect of threads and drives the receiver 15 to slide within the slideway 11. The end part of the adjustment screw 13 is snap-fixed into a groove on the receiver 15. The receiver 15 is a separated-type structure which is consisted of upper and lower portions, wherein both of the portions are fixed onto the slideway 11 by the screw and the nut, and can move freely within the slideway 11. The receiver 15 achieves forward and backward movements according to the displacement of the adjustment screw 13. Movement of the receiver 15 achieves adjusting the degree of tightness of the cover. The above slideway 11, adjustment base 12, adjustment screw 13, adjustment knob 14 and receiver 15 constitute a movable cover tightening means, and when one side of the rear bumper is snapped into the receiver, fine movement of the receiver achieves tightening and loosening of the cover.

Figure 3:
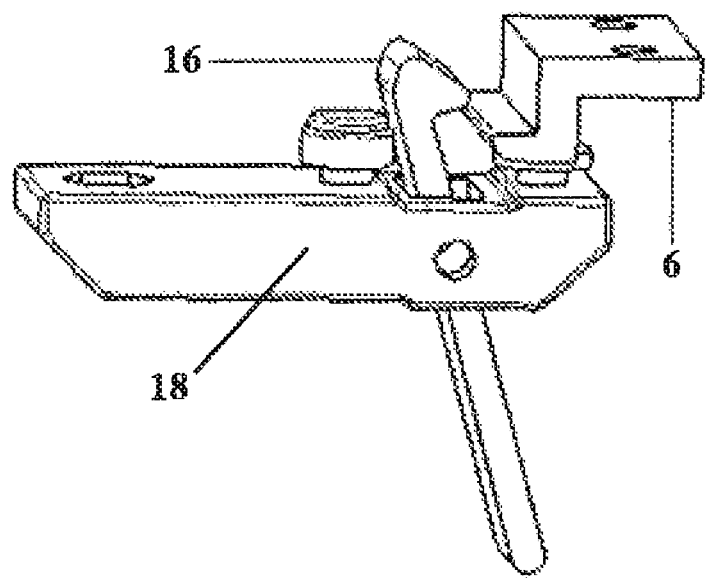
FIG. 3 is a schematic view of open state or unlocked position of a lock hook and locking base.
Figure 4:
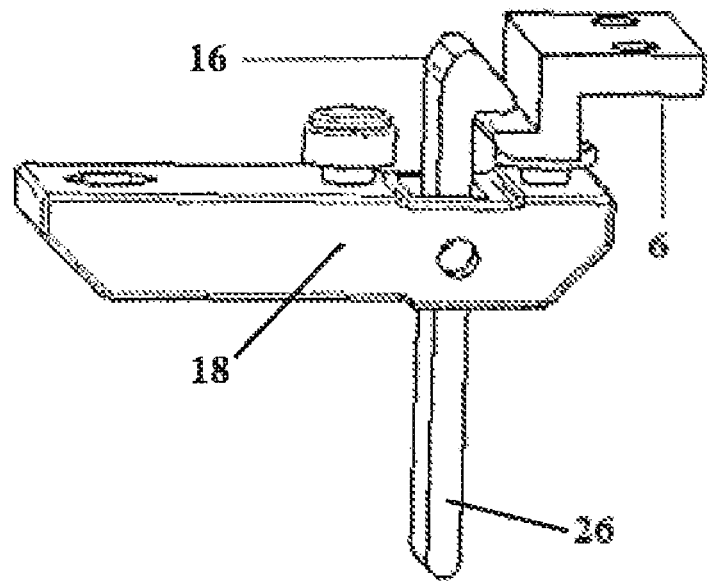
FIG. 4 is a schematic view of closed state or locked position of a lock hook and locking base.
Figure 5:
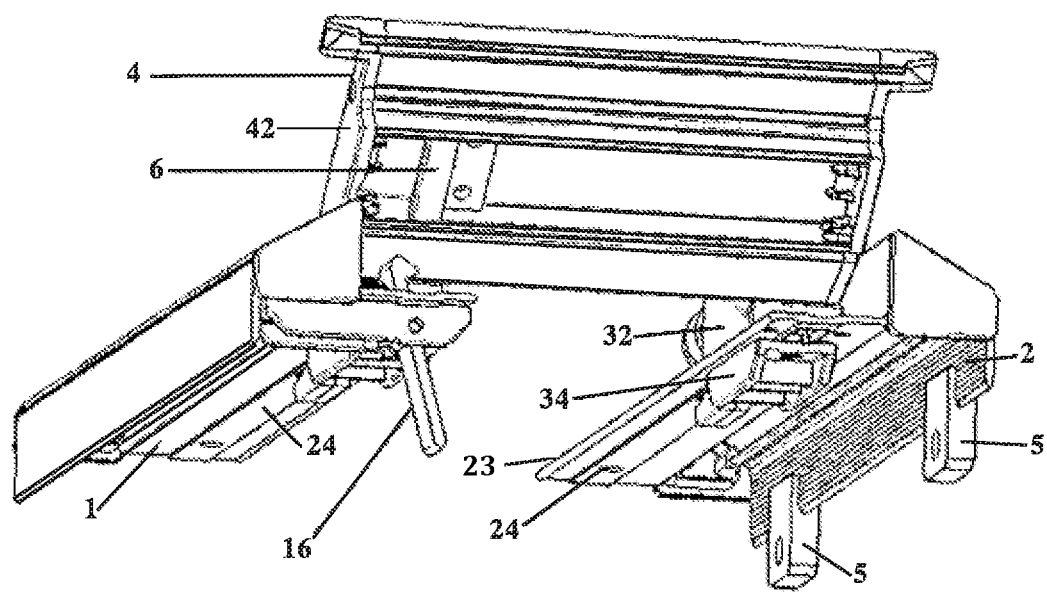
FIG. 5 is a schematic view of a rear bumper being fixed with first and second side rails.

As shown in FIGS. 3, 4 and 5, the lower portion of the inner side of the first side rail, specifically, located in the lower portion of the slideway 11, is further provided with a lock hook 16 for locking the first side rail and the rear bumper. Correspondingly, a locking base 6, which also may be known as a locking means, corresponding the lock hook 16 is provided in the groove of the bottom portion of the rear bumper. The outer side of the rear bumper is connected with the cover, the inner side is snapped into the receiver 15, and when a depression force is applied to the rear bumper, the depression force of the locking base 6 causes the lock hook 16 to produce an angle change, thereby achieving the snap of the lock hook 16 with the locking base 6. The lock hook 16 engages the locking base 6 at various locations across a length of the locking base 6. The location that the lock hook engages the locking base 6 depends upon the displacement of the adjustment screw 13 which displaces the receiver 15 and in turn moves the rear bumper. The lock hook 16 passes through the inner side of the first side rail and is fixed with the first side rail by the screw, nut and elastic mechanism.

Correspondingly, the structure of the second side rail is not provided with the lock hook, and other structures are symmetric with the first side rail. The purpose of providing only one lock hook 16 lies in that, since the side to side distance of the compartment tends to be longer, it may make it inconvenient for a person to open when in use if the first and second sides are both provided with the lock hook. When it is needed to open the lock hook 16, the locking base 6 and the lock hook 16 would fall off naturally by applying only a slight force and thus making the angle of the lock hook 16 changed.

Figure 6:
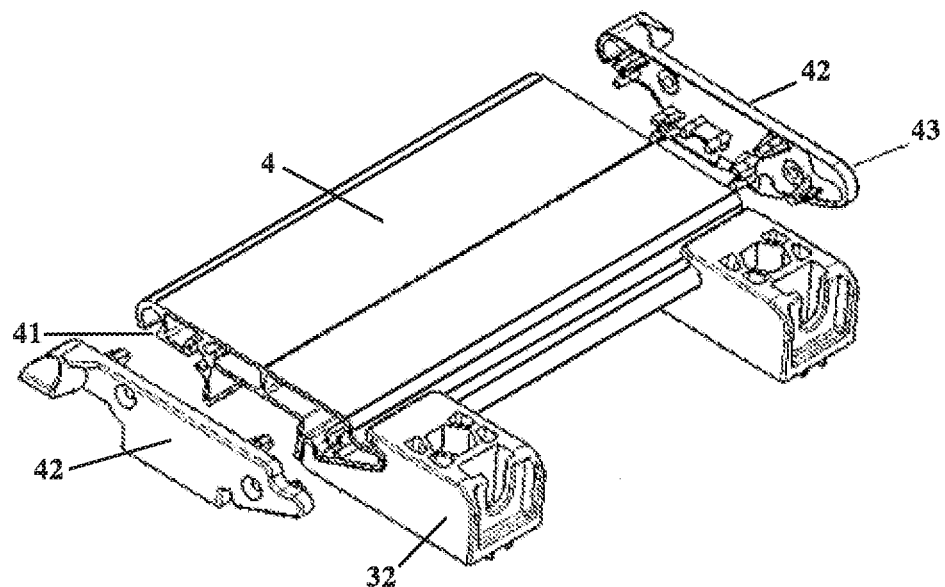
FIG. 6 is a structural schematic view of a rear bumper.

As shown in FIG. 6, one side of the rear bumper 4 connected with the cover 22 is provided as a cylindrical shaped opening 41, the side of the cover 22 connected with the rear bumper 4 is wrapped with a rigid cylindrical object (not shown), and the diameter of the cylindrical object wrapped by the cover 22 is less than the diameter of the cylinder cylindrical opening 41 provided on one side of the rear bumper 4, so that the above cylindrical object is inserted into the cylindrical opening 41, thereby achieving the fixation of the cover with the rear bumper.

Correspondingly, the other side of the cover connected with the rear bumper is connected with the front bumper, and one side of the front bumper is provided as a cylindrical shape with openings, this side is connected with the cover, and one side of the cover connected with the front bumper is wrapped a rigid cylindrical object, wherein the diameter of the cylindrical object wrapped by the cover is less than the diameter of the cylinder provided on one side of the front bumper, so that the above cylindrical object is inserted into the cylinder through the opening, thereby achieving the fixation of the cover with the front bumper.

The bottom surface of the rear bumper 4 is provided with the groove 28, and the middle part of the groove 28 is provided with a set of LED lamp groups 30. The role of the LED lamp group lies in that, when in use, the LED lamp group can be used as an effective lighting tool when the light is poor.

Figure 7:
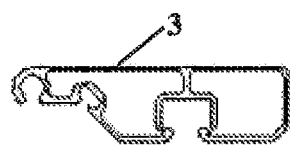
FIG. 7 is a cross-sectional schematic view of a front bumper.
Figure 8:
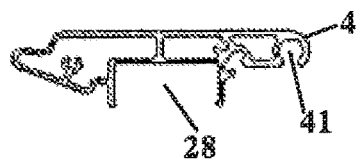
FIG. 8 is a cross-sectional schematic view of a rear bumper.

As shown in FIG. 7, meanwhile, the bottom portion of the front bumper is provided with a groove having a wide bottom portion and a narrow upper portion and is provided with two screws, the spacing of the upper portion of the groove being less than the diameter of the end part of the screw, which are snapped in the middle of the groove, and the effect that the screw will not fall off the groove can be achieved. The screw passes through the circular hole of the upper portion of the first side rail and the circular hole of the second side rail, respectively, and is fixed with the first and second side rails by the damped nut.

The front bumper, rear bumper, first side rail and second side rail are all hollow structures, and before forming a final hood, the cross-sections of the front bumper, rear bumper, first side rail and second side rail, are covered using plugs. As shown in FIG. 6, the plug 42 of the rear bumper has a protruding portion 43 after closing the cross-section by the plug, the protruding portion is snapped into the clearance between the receiver 15 and the first side rail, such that the receiver 15 is more stable when sliding.

Two sides of the back of the cover are provided with strip-like PVC material, also, the first and second side rails of the cover assembly are also provided with PVC material thereon, the left and right sides of the cover and the first and second side rails of the cover assembly are bonded via the above PVC material. The inner side of the two sides of the back of the cover is provided with three pairs of PVC materials for bonding the stand bar which is in a cylindrical shape and has a length less than the width of the cover. Two ends of the stand bar are provided with PVC material for the bonding of the stand bar and the cover. The stand bar is used to fix the cover, and to prevent the cover from sagging.

The other two sides of the cover are connected with the front and rear bumpers, respectively.

The bottom portion of the front bumper is further provided with a strap, which is used for fixation upon retracting the cover.

Figure 9:
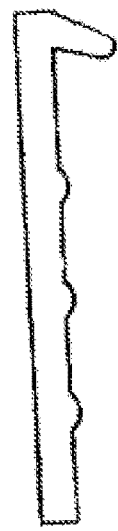
FIG. 9 is a cross-sectional schematic view of a sealing strip.
Figure 10:
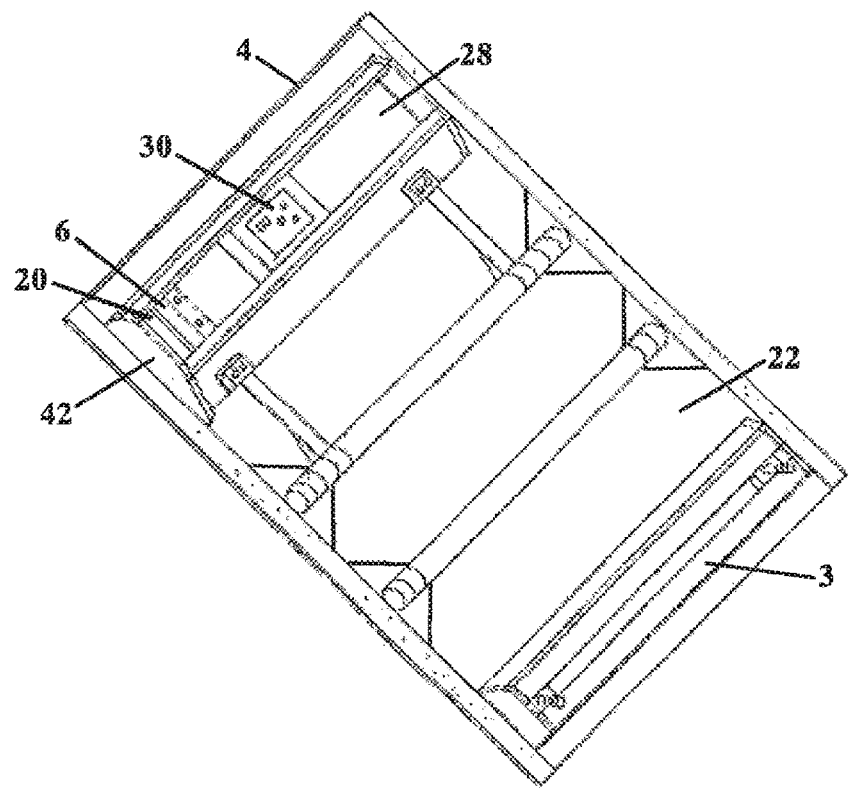
FIG. 10 is a schematic view of the bottom surface of the overall structure of the present invention.

As shown in FIG. 9, the first and second side rails and the compartment are provided with a sealing strip there between, and the sealing strip has protruding upper eaves on the upper portion. The sealing strip may provide a rainproof function, so than rain water cannot flow into the compartment through the first and second side rails and the compartment, and also reduces wear between the first and second side rails and the compartment. In addition, the sealing strip also provides a positioning and guiding function during cover installation.

In summary, a roll-up cover assembly is described and comprises first and second side rails 1 and 2; front and rear bumpers 3 and 4; and a cover. A lower portion of an inner side of the first side rail includes a slideway 11, an adjustment base 12 fixedly coupled to the first side rail 2 and having an adjustment knob 14, a receiver 15 having an upper portion and a lower portion, with both the upper and lower portions being coupled to the slideway 11, and an adjustment screw 13 adapted to pass through the adjustment base 12 and the adjustment knob 14 and having an end portion. The end portion is fixed into a groove on the receiver. When the adjustment knob 14 is turned, the adjustment screw 13 produces a displacement and drives the receiver 15 to slide within the slideway 11. Additionally, the lower portion of the inner side of the first side rail further includes a lock hook 16 passing through the first side rail 2 and fixed with the inner side of the first side rail 2. The lock hook 16 is adapted to lock the rear bumper 4 to the first side rail 2. Moreover, when the adjustment knob 14 is turned, the adjustment screw 13 produces a displacement of the receiver 15 and changes a location of the rear bumper 4 relative to the first side rail 2 when the rear bumper 4 engages the receiver 15.

The roll-up cover assembly also includes a locking base 6 mounted to the rear bumper 4 and the lock hook 16 is configured to be selectively attachable to the locking base 6. Moreover, the lock hook 16 is selectively attachable to the locking base 6 at various locations on the locking base 6 depending on the location of the rear bumper 4 relative to the first side rail 2. Additionally, the lock hook 16 moves between a locked position where the rear bumper 4 is locked to the first side rail 1 and an unlocked position where the rear bumper 4 is unlocked from the first side rail 1 in a direction perpendicular to the first side rail 1.

Additionally, the rear bumper 6 is a hollow structure and a cross-section of the rear bumper is covered using a plug 42. The locking base 6 and the plug at least partially define an opening 20 and an upper portion of the lock hook 16 is disposed through the opening. Moreover, the first side rail 1 has a top face 23 and a bottom face 24 and the upper portion 32 of the receiver 15 is disposed about the top face 23 and the lower portion 34 of the receiver 15 is disposed about the bottom face 24. A trigger base 18 fixed to the first side rail and having the lock hook disposed there through. The trigger base 18 is disposed perpendicular to the first side rail. The lock hook is pivotally mounted to the trigger base 18.

The cover 22 is coupled to the rear bumper 4 such that movement of the rear bumper 4 relative to the first side rail 1 provides adjustment to a degree of tightness of the cover 22. The lock hook 16 moves between a locked position where the rear bumper 4 is locked to the first side rail 1 and an unlocked position where the rear bumper 4 is unlocked from the first side rail 1. A direction of the displacement of the receiver 15 is transverse to a direction of the movement of the lock hook 16 between the locked position and the unlocked position. The lock hook 16 may also include a spring-bias mechanism and the lock hook 16 may be spring biased in a single direction. The lock hook 16 may additionally include handle 26 for a user to engage or disengage the first side rail 1 from the rear bumper 4. Moreover, a bottom surface of the rear bumper 4 includes a rear groove 28, and a middle portion of the rear groove 28 includes at least one LED lamp 30.

What is claimed is:
1. A roll-up cover assembly comprising:
first and second side rails;
front and rear bumpers; and
a cover extending between the front and rear bumpers;
wherein a rear portion of the first side rail includes:
a slideway;
an adjustment base fixedly coupled to the first side rail;
a receiver having an upper portion and a lower portion, wherein both the upper and lower portions are coupled to the slideway;
an adjustment screw adapted to pass through the adjustment base and having an end portion, wherein the end portion is fixed into a groove on the receiver; and
wherein the adjustment screw produces a displacement and drives the receiver to slide within the slideway; and
a lock hook coupled to the first side rail and movable between a locked position in which the lock hook locks the rear bumper to the first side rail, and an unlocked position in which the lock hook allows the rear bumper to move away from the first side rail, wherein the lock hook moves from the locked position to the unlocked position in a direction perpendicular to the first side rail.

2. The roll-up cover assembly of claim 1, wherein the lock hook passes through the first side rail and is fixed against an inner side of the first side rail.

3. The roll-up cover assembly of claim 2, wherein the adjustment base includes an adjustment knob, and when the adjustment knob is turned, the adjustment screw produces a displacement of the receiver and changes a location of the rear bumper relative to the first side rail when the rear bumper engages the receiver.

4. The roll-up cover assembly of claim 1, further including a locking base mounted to the rear bumper wherein the lock hook is configured to engage the locking base in the locked position.

5. The roll-up cover assembly of claim 4, wherein the lock hook is selectively attachable to the locking base at various locations on the locking base depending on the location of the rear bumper relative to the first side rail.

6. The roll-up cover assembly of claim 1, wherein the adjustment screw passes through an adjustment knob and wherein turning the adjustment knob causes the adjustment screw to produce the displacement.

7. The roll-up cover assembly of claim 3, wherein the rear bumper is a hollow structure and a cross-section of the rear bumper is covered using a plug.

8. The roll-up cover assembly of claim 7, wherein the locking base and the plug at least partially defines an opening and an upper portion of the lock hook extends into the opening.

9. The roll-up cover assembly of claim 1, wherein the first side rail has a top face and a bottom face and the upper portion of the receiver is disposed about the top face and the lower portion of the receiver is disposed about the bottom face.

10. The roll-up cover assembly of claim 1, wherein the lock hook is coupled to a trigger base that is fixed to the first side rail.

11. The roll-up cover assembly of claim 10, wherein the trigger base is disposed perpendicular to the first side rail.

12. The roll-up cover assembly of claim 10, wherein the lock hook is pivotally coupled to the trigger base.

13. The roll-up cover assembly of claim 1, wherein movement of the rear bumper relative to the first side rail provides adjustment to a degree of tightness of the cover.

14. The roll-up cover assembly of claim 1, wherein a direction of the displacement of the receiver is transverse to a direction of the movement of the lock hook between the locked position and the unlocked position.

15. The roll-up cover assembly of claim 2, wherein the lock hook comprises a handle for a user to engage or disengage the first side rail from the rear bumper.

16. The roll-up cover of claim 1, wherein a bottom surface of the rear bumper includes a rear groove, and a middle portion of the rear groove includes at least one LED lamp.

* * * * *

UNITED STATES PATENT AND TRADEMARK OFFICE
CERTIFICATE OF CORRECTION

PATENT NO.         : 9,776,562 B2                                              Page 1 of 1
APPLICATION NO.    : 15/135960
DATED              : October 3, 2017
INVENTOR(S)        : Scott Williamson et al.

It is certified that error appears in the above-identified patent and that said Letters Patent is hereby corrected as shown below:

On the Title Page

At Column 1, (72) Inventors, Line number 4, before "Jiangsu", insert --Nanjing,--;

At Column 1, (72) Inventors, Line number 5, before "Jiangsu", insert --Nanjing,--;

At Column 1, (72) Inventors, Line number 6, before "Jiangsu", insert --Nanjing,--;

At Column 1, (73) Assignee, Line number 1, delete "Liners," and insert --Liner,--; and, At Column 1, (30) Foreign Application Priority Data, Line number 1, delete "2015 1 0195963" and insert --201510195963.6--.

In the Claims

At Column 8, Claim number 16, Line number 24, before "of claim 1,", insert --assembly--.

Signed and Sealed this
Twenty-first Day of November, 2017

Joseph Matal
*Performing the Functions and Duties of the
Under Secretary of Commerce for Intellectual Property and
Director of the United States Patent and Trademark Office*